UNITED STATES PATENT OFFICE.

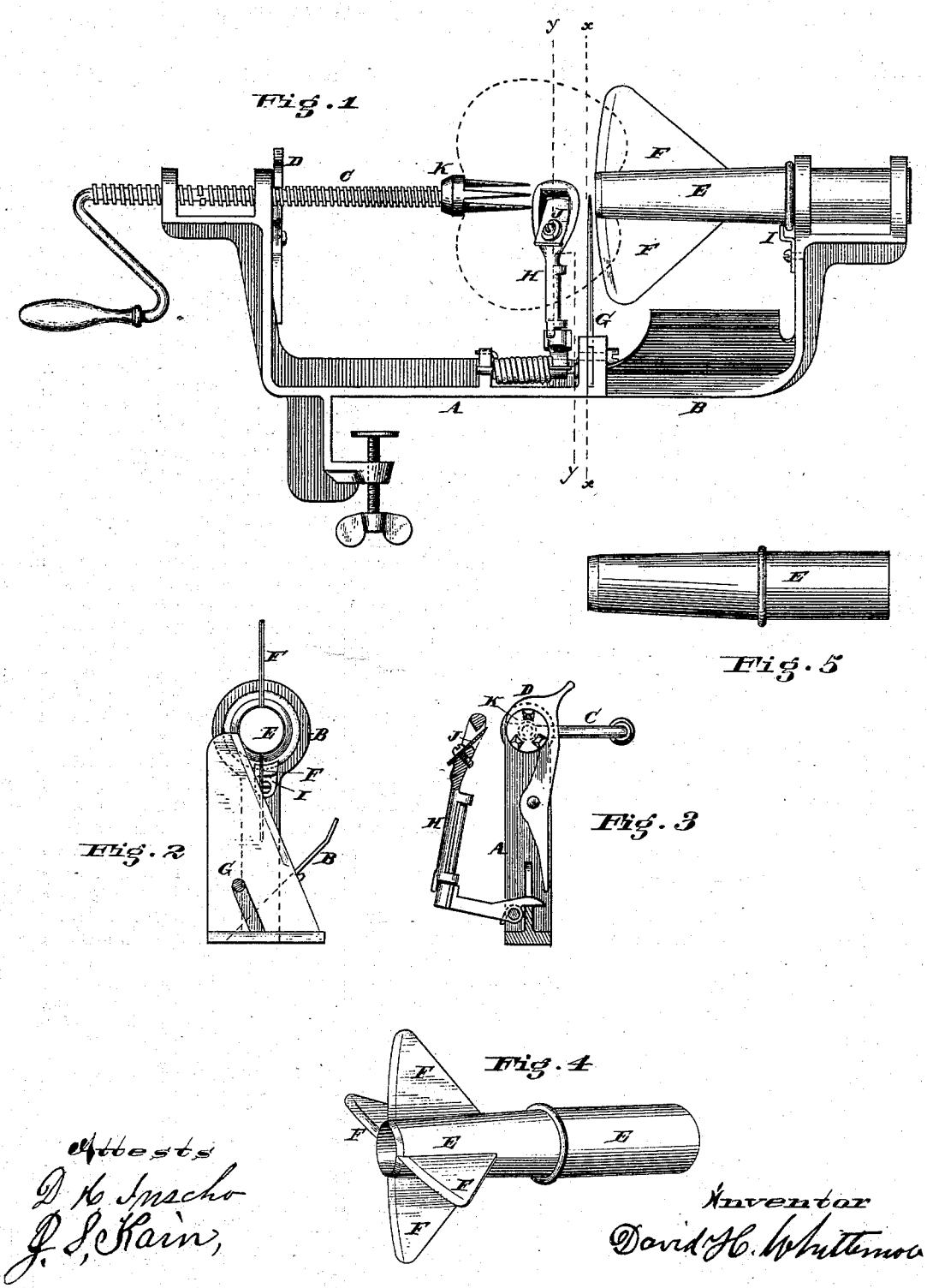

DAVID H. WHITTEMORE, OF WORCESTER, MASSACHUSETTS.

APPLE PARER, CORER, SLICER, AND QUARTERER.

SPECIFICATION forming part of Letters Patent No. 251,982, dated January 3, 1882.

Application filed October 26, 1881. (Model.)

*To all whom it may concern:*

Be it known that I, DAVID H. WHITTEMORE, of the city and county of Worcester, State of Massachusetts, have invented certain new and useful Improvements in Apple Paring, Coring, Slicing, and Quartering Machines, of which the following is a specification.

My invention relates mainly to the mode or modes of cutting the apple in the various shapes, such as cutting in a spiral slice, or cutting said slice by radial revolving cutters in pieces of the desired size; also relates to means for dispensing with the slicing-knife to core only, to core and quarter, or core and halve, as may be desired, according to the number of cutters on the corer.

The nature of my improvements is more fully shown in the following description and the accompanying drawings.

Figure 1 is a side view of the machine arranged to pare, core, and slice spirally, and to cut in half each circle of the slice. Fig. 2 is an end view of the slicing, cutting, and coring arrangement after being detached from the main frame at dotted line *x*. Fig. 3 is an end view of the frame from the front, cut at the dotted lines *y y*, Fig. 1, showing the position of the paring-knife J, fork K, &c. Fig. 4 is a coring and quartering arrangement made interchangeable with the coring and halving arrangement now shown in position in frame B, Fig. 1. Fig. 5 is a coring-tube made interchangeable in frame B, the same as Fig. 4.

In Fig. 1, A is the main frame, made with a clamp below to hold it to the table. B is the frame or attachment for holding the coring and cutting arrangement. At the outer end of frame B are two bearings, in which turns the coring-tube E. C is the crank or fork shaft, which is allowed to slide easily in either direction when the catch D is not pressed in to the screw C on the shaft. E is the coring-tube, fitted loosely in the frame B, so as to allow it to turn easily in its bearings. F F are cutters radiating from the coring-tube E, and serve to halve the apple that is not cut out by the coring-tube E. G is the slicing-knife, held between the frame A and frame B. The upper end of the slicer-knife reaches to the outside of the corer E, and serves to slice the apple to the core when said apple is turned and forced forward by the screw on the shaft C. H is the paring-knife stem, with paring-knife J inserted at the top, and spring to press the knife against the apple at the bottom. I is a holder to hold the tube E from slipping out of its bearings in frame B. When it is desired to change the tube E the holder I is easily turned one side, so that the coring-tube E can be slid out of its bearings.

In Fig. 2, G is a side view of the slicing-knife; E, the coring-tube, and F F the cutting-arms attached to the coring-tube. I is a side view of the holder for holding the tube E in place. B is the edge of the bottom of the frame B, for holding the corer and cutters, which bottom is made inclined, so that the slices or pieces of apple, when they drop, will slide out and away from the machine. The slot seen at the bottom of the knife G is for the easy removal of the knife without having to take out the screw that passes through it to hold it in position.

In Fig. 3 is shown a section of the frame A and knife-head H, cut as shown by the dotted lines *y y* in Fig. 1. Fig. 3 also shows a s de view of the catch D, which, when pushed forward into the screw-threads on the shaft, causes the shaft, when turned, to move forward.

Fig. 4 is a coring-tube, E, with four cutters, F F F F, attached, and is made to be interchangeable in the frame B. (Seen in Fig. 1.) When the slicer-knife G is not inserted with the part shown by Fig. 4 the apple is pared, cored, and quartered. More or less of these cutters F may be placed upon the coring-tube F, according to the size of the pieces of apple desired. If the slicing-knife G were in position with the corer E and cutters F F F F, the apple would be sliced in a spiral slice, and each circle of the slice would be cut in quarter-sections. The paring is done by the paring-knife J at one and the same time with the slicing, cutting, and coring. The machine will only pare when the slicer-knife G and frame B are removed.

Fig. 5 represents simply a corer to be used in the frame B, by which, when used only with the paring-knife J, the apple would be simply pared and cored. If the slicer-knife G were inserted in the machine with the coring-tube, Fig. 5, the apple would be pared, cored, and cut in a spiral slice.

To operate my machine as shown in Fig. 1, I pull the fork K back to or near the catch D, when I place the apple on the fork. I then push forward the apple to the paring-knife J, and push the catch D in the screw, and turn. The apple is moved forward in its rotations upon the paring-knife J; then slicer-knife G commences to cut the apple in a spiral slice. This now revolving slice moves forward upon the cutters F F, causing them, with the corer E, to turn with the apple. The spiral slice, being thus in its rotation with the cutters, is forced upon them, and is cut in half-circles. The apple at the same time is forced upon the edge of the corer E to cut out the core. In the operation the half-circle slices of apple drop from the corer and cutter and slide out one side, while the core is forced forward through the tube E and drops at the end, thus separating the apple from the core.

By loosening the screw at the bottom of the slicer G the slicer can easily be pulled out, and when so done the apple will not be sliced, but will be moved forward in its revolutions upon the corer E and cutters F F, causing them to turn, and the apple is finally forced its length upon the corer and cutters, causing it to be pared, cored, and halved, in which shape it can be easily used for different purposes.

If the part shown by Fig. 4 be placed in the machine with its four cutters F F F F, the apple would be pared, cored, and quartered. If the slicer-knife G were added, the apple would be sliced spirally, and each circle of the slice would be cut in quarter-sections. The corer E (represented by Fig. 5) will core the apple when the slicer is removed.

It will be seen that a great variety of work can be done with my improvements with only slight changes required to accomplish it. The apple left in either shape described is in good and superior shape for use.

Having thus described my improvements, what I claim as my invention, and desire to secure by Letters Patent, is—

1. In an apple paring, coring, and slicing machine, the coring-tube E, having a tubular opening, in combination with frame B, provided with bearings for said coring-tube, in which it is adapted to rotate freely, and means to feed an apple positively against the cutting-edge of said corer, and at the same time give it a rotating movement, substantially as and for the purpose specified.

2. In an apple paring, coring, and slicing machine, the coring-tube E, having an open tubular passage-way for the core through the same, in combination with a frame provided on one end with bearings in which the coring-tube is adapted to rotate, and on the other with means to feed an apple positively against the coring tube, and at the same time cause it to rotate, and a paring-knife located between said coring-tube and feed mechanism and hinged to the frame, substantially as and for the purpose specified.

3. A coring-tube for paring, coring, and slicing machines, which consists of a tube having an open tubular passage-way for the core through it, said tube being provided at the end farthest from the cutting-edge with a bearing portion and a flange at the end of said bearing portion next to the cutting-edge, and one or more edged cutters radiating from said tube upon its cutting end, said tube and cutters being adapted to rotate as the rotating apple is brought into contact with the same, substantially as shown and described.

4. In a paring, coring, and slicing machine, the combination of the coring-tube E, supported in bearings at one end of the frame, and means to feed the apple upon the coring-tube and rotate the same secured to the other end of the frame, with a paring-knife, J, located between said coring-tube and feed mechanism, and a slicing-cutter, G, rigidly secured to the frame, and located between the paring-knife and coring-tube, substantially as shown and described.

5. In an apple coring and paring machine, the frame B, with its bearings, in combination with the coring-tube E, adapted to rotate freely in said bearings, said coring-tube being provided with a flange and a holding-catch, I, to hold the flange of the coring tube between itself and the bearings to prevent longitudinal movement of said tube, substantially as shown and described.

DAVID H. WHITTEMORE.

Witnesses:
D. H. INSCHO,
J. S. KAIN.